Patented July 7, 1931

1,813,357

UNITED STATES PATENT OFFICE

HUGH T. O'NEILL AND ARTHUR J. HARRIMAN, OF WASHINGTON, DISTRICT OF COLUMBIA

ART OF TREATING FRUITS

No Drawing. Application filed May 13, 1930. Serial No. 452,128.

This invention relates to improvements in treating fruit and more particularly to a novel method of classifying fruit, and preparing same for shipment.

Hitherto, it has been proposed to alleviate or inhibit the destruction of fruits and more particularly the citrous varieties by coating the same with borax or other chemical agents having an antiseptic or inhibiting effect on molds and other saprophytic fungi upon the fruits. Various theories have been advanced to explain the action of such organisms and the conditions most favorable to their propagation. Among other palliatives, it has been suggested, that fruits should be treated with a mineral oil or wax composition, dissolved in a suitable solvent or emulsified in water to approximate or restore a coating to the fruit equivalent to the natural wax coating. In spite of these various proposed measures large sums of money are expended annually in combating, with limited success, attacks of molds upon fruit and vegetables in storage or shipment.

The moisture of the atmosphere accelerates the spread and growth of this disease. While the use of boric acid and borates retards but does not prevent either growth or spread of molds its toxicity is such that its use on food products is highly undesirable when applied to the skin or peel of fruits. In addition, when ingested by humans its poisonous effects are cumulative. Such conditions may readily happen where borax or other compounds of boric acid are used to treat fruit which is subsequently eaten without thoroughly washing off the coating. A particular source of such trouble is in marmalades, which have been made from the skins of citrus fruits, which have been treated with boric acids or other boron compounds and which have been processed without the necessary precautions being taken to remove all traces of the poison.

As a result of protracted experiments and tests, we have found that fruit in which fungal infection has once started cannot be saved by means of any known antiseptic or fungicide. We have found further that by properly inspecting fruit before packing and insuring that only perfectly and carefully dried sound fruit, free from even microscopic abrasions, such as those caused by the nails of workmen are selected and are packed in such a manner as to avoid puncturing by means of nails or splinters in the shipping crates that it is possible to ship and keep fruit for extended periods without any deleterious effect or damage arising from fungal infections. In one experiment recently conducted, to confirm our theory, over 400 oranges were kept for over a month in a perfectly damp, dark cellar, with no rotting, although infected oranges were included in the group to provide a source of infection. This group of oranges, other than the infected ones were carefully sorted and tested according to the method hereinafter to be described, in order to make certain that they were perfectly free from abrasions of any sort.

In the course of our experiments it was determined that acid media are favorable to fungal growth and that the inhibitory action of borax and similar compounds appears to be due to a lowered acidity or more properly a condition of basicity, as determined by the pH value and is substantiated by the fact that similar results were obtained with basic substances such as soda ash. It is therefore assumed that while borax has a certain inherent toxic action an appreciable part of its inhibitory effect is due solely to its alkalinity. As a result of our tests it is considered that perfect, normal fruit will keep indefinitely.

It is an object of this invention to provide an improved process for inspecting and culling of potentially infected fruit.

It is a further object of this invention to provide an improved process for the classification of sound and potentially infectable fruits.

Yet another object of this invention is the provision of a novel process and means for establishing or determining the soundness and, therefore, the keeping qualities of fruit.

A further object of this invention is the provision of a novel, chemical treatment whereby to establish the availability of fruit for shipping purposes or for immediate processing into canned or packaged products.

These and other desirable objects of the present invention will be described in the accompanying specification, certain preferred examples being given by way of illustration only, for, since the underlying principles may be applied to other specific products and their treatment it is not intended to be limited to the one here disclosed, except as such limitations are clearly imposed by the appended claims.

The invention in its essential parts comprehends the treatment of various fruits, of which oranges, apples, plums, cucumbers and the like may be cited as specific examples of various genera or types, as well as tomatoes, avocadoes, mangoes, figs, grapes, currants, gooseberries, etc., although it is to be understood that other members of their respective families are susceptible of treatment to advantage by applying the principles of the present invention.

As noted above, fruits may be abraded on the trees, or after removal therefrom and while en route to packing establishments by injuries from insects, or from abrasions caused by workers' fingernails, cutting instruments and the like. While, as a rule, all fruits intended for shipment are subjected to a preliminary and casual inspection to determine their suitability for further handling such inspection can only determine the nature and extent of microscopic injuries and does not locate the microscopic injuries of the types above noted. As the spores of fungi, such as molds, are everywhere present and particularly so in and around packing establishments, it is a very easy matter for fungal infection to gain entrance through a microscopic abrasion in the skin of a fruit. This is true, even though the skin may be coated with a fungus-inhibiting compound, such as borax or the like. While the growth and spread of infection is influenced by atmospheric conditions, such as temperature and humidity, yet when infection has been introduced through epidermal rupture it cannot be stopped by any surface treatment of the fruits.

By molds we understand all small fungi, usually saprophytic, whether they are basidiomycetes or ascomycetes. As instances of the first class, we cite the genera Penicillium (including citromyces); Botrytis; Phycomycetes rhizopus mucor.

Basidiomycetes
    Penicillium italicum
    P.          diagitatum
    P.          olivaceum
    P.          glaucum
Ascomycetes
    Sclerotinia
        S. fructigena As noted above, we have determined that perfectly sound fruit i. e., those without surface abrasions of any sort, will keep indefinitely even in the presence of sources of infection and under conditions normally favorable to the propagation of mold growths and the like.

It follows, therefore, that the only safe method to pursue in preparing fruit for shipment is to pack completely sound fruit and to cull out potentially unsound fruit, which may either be processed, as in the manufacture of jams or marmalades, or otherwise treated, as for recovery of pectin values, etc.

In the course of our experiments, we have discovered that microscopic abrasions in the surface of a fruit may be made visible, or macroscopic, by subjecting the fruit to a treatment which will differentially color the abrasion with respect to the rest of the skin of the fruit. By the term microscopic abrasion, we intend to cover all abrasions, cuts, nicks, or other broken-skin conditions, or ruptures of the epidermis which are normally invisible, or difficulty discernible, in the course of the usual visual inspection of the fruit under manufacturing conditions, it being of course, well understood, that a microscopic examination of fruits during packing is not physically possible.

To render these microscopic abrasions visible, and thus locate the foci of existing or potential infections, we treat the fruits with a compound or compounds, either in solution or incorporated in fluid vehicles, in any suitable manner, as by emulsification or colloidalizing or dispersing therein, which compounds are adapted to color the abraded portions and cause them to be distinguished thereby from the surrounding skin.

The invention also comprehends the application of dry dusts, such as pulverized ferric chloride, ferric alum, and the like, either alone, or in admixture with any suitable diluent, such as pulverulent kaolin, air-blown whiting, talcose materials, and the like. These materials may be blown or sprayed onto the fruit, while in process, and the distinctive markings produced in this manner.

One method of practicing the invention involves the passing of fruit through a tank or vat containing a coloring matter in solution, which coloring matter is adapted to be absorbed or adsorbed into the abrasions and thus identify the loci or foci of infection. Any suitable coloring matter may be made use of, such as the well known dyes called "certified dyes" and permitted for use in coloring food stuffs or direct cotton or pulp dyes i. e. such as dye cellulose. A typical example of such "certified" compounds is the yellow dye, known as naphthol S, an example of cellulose dyes, "direct black" or Congo red. While such coloring agent may or may not react with the tannin or tannin-like bodies occurring beneath the epidermis of fruits, it is preferred to use a compound or coloring matter, which will react with the tannin-like bodies of the fruits to form distinctively colored compounds. For this purpose, any of the soluble salts of the metals, which are adapted to react with tannin, may be used. Among these metals whose salts may be used may be mentioned silver, copper, titanium, vanadium, antimony, bismuth, chromium, molybdenum, tungsten, manganese, and iron. While these compounds, as above noted, form colored compounds with the tannic acid, the majority of the metallic cations are distinctly poisonous when ingested and care should be taken to thoroughly cleanse the fruit and remove the colored compounds, if the culled fruit, exhibiting such markings, is to be processed further, and sold in any form for human consumption. This may be accomplished by subjecting the abraded fruits exhibiting distinctive markings, as a result of the interaction of the cations disclosed, and the tannic acid of the fruit, to a bath of a weak acid or of reducing agents such as oxalic acid, potassium binoxalate, or stannous chloride. Such reducing agents are to be removed by subsequent washing to dissolve out the compounds formed. Such treatment is well adapted for fruits which are to be classed as seconds, and sold for immediate consumption or which are intended to be processed further, as in the manufacture of canned grapefruit and the elaboration of the rind into marmalade.

However, in the case of iron compounds, such as ferric chloride, such precautions are not necessary, as the ferric ion is not poisonous when ingested and is, in fact, included in the Pharmacopaeia. The use of an iron salt, such as ferric chloride, for the purpose indicated, gives particularly desirable results, in that the combination of the iron with the tannic acid gives ferric tannate. The formation of such a distinctive black marking against the yellow or orange background of oranges, grapefruit, apples and other fruits gives a very ready means of quickly distinguishing abraded fruits and thus facilitates the inspection and culling of such fruits from normal, sound fruits. The sound fruits should be thoroughly dried and in packing for shipment, care should be taken that the fruits are not subjected to the action of any sharp edges or piercing, as may occur from the presence of nails, splinters, etc. The yellow color of ferric chloride is particularly adapted to the inspection and culling of oranges and other citrus fruits, in that it blends well with the color of the fruits, being substantially indistinguishable therefrom, even when permitted to dry thereon.

The ferric chloride, or ferric tannate stain, formed in the abrasions may be readily removed, if desired, by a suitable treatment, as indicated above. Due to its cheapness and ease of application, as well as its lack of toxicity when ingested, and also to the ease with which it and its substitution compounds may be removed, it is particularly suited for extended use in the inspection and culling of potentially unsound fruits and more particularly is adapted for use in the citrus industry where the culling and diverting from shipment of abraded fruits is of prime importance.

While the identification of potentially unsound fruits by means of differential coloration, has been disclosed, other methods involving a plurality of steps and the formation of organic colorations, such as " lakes ", in the abrasions is comprehended in the scope of our invention. However, as such a process involves fundamentally distinct operations they will be claimed in a separate case Serial No. 456,283, filed May 27, 1930.

By way of résumé, it is to be noted that workmen engaged in the handling, classifying and packaging of normally sound fruits for shipment, should have their nails well trimmed or be required to wear rubber gloves, in order to prevent microscopic punctures of the fruit which may take place at any stage of the handling of the fruit.

It will now be understood that there has been provided a novel process for classifying fruits for shipment and for determining the soundness and potential or existing infection thereof, which process is easy of manipulation as well as characterized by extreme simplicity and low cost, permitting the sale of guaranteed, sound fruit, which is susceptible of keeping without spoilage for long periods of time.

We claim:

1. The process of grading fruit, which comprises treating said fruit with a reagent adapted to react with abraded portions of the fruit whereby to form distinctive markings indicating the loci and extent of such abrasions, and culling such marked fruit from the fruit unmarked by the said treatment.

2. The process of grading fruit to determine its susceptibility to mycological infection and thereby determine its keeping qualities which comprises treating such fruit with a compound adapted to react with subcutaneous tannin bearing portions of the fruit exposed by abrasion, whereby to form readily discernible reaction compounds, and thereafter culling the colored fruit from the uncolored fruit.

3. The process of treating citrus fruit to determine its susceptibility to mycological infection and thereby determine its keeping qualities which comprises treating such fruit with iron compounds adapted to react with subcutaneous tannin bearing portions of the fruit exposed by abrasion, whereby to form readily discernible reaction compounds, and thereafter culling the colored fruit from the uncolored fruit.

4. The process of treating citrus fruit to determine its susceptibility to mycological infection and thereby determine its keeping qualities, which comprises treating such fruit with ferric compounds adapted to react with subcutaneous tannin bearing portions of the fruit exposed by abrasion, whereby to form readily discernible reaction compounds, and thereafter culling the colored fruit from the uncolored fruit.

5. The process of treating citrus fruit to determine its susceptibility to mycological infection and thereby determine its keeping qualities, which comprises treating such fruit with ferric chloride adapted to react with subcutaneous tannin bearing portions of the fruit exposed by abrasion, whereby to form readily discernible reaction compounds and thereafter culling the colored fruit from the uncolored fruit.

6. The process of treating citrus fruit to determine its susceptibility to mycological infection and thereby determine its keeping qualities, which comprises treating such fruit with ferric alum adapted to react with subcutaneous tannin bearing portions of the fruit exposed by abrasion, whereby to form readily discernible reaction compounds, and culling such marked fruit from the fruit unmarked by such treatment.

7. In the process of rendering microscopic abrasions in fruit macroscopic for the purpose of facilitating inspection and culling, the steps comprising the treating of fruit with a coloring reagent adapted to be preferentially deposited in the abraded portions in greater quantity than on the unbroken surface of the fruit whereby to form distinctive markings, and grading the fruit by separating the marked fruit from the fruit which is unmarked by said treatment.

8. In the process of rendering microscopic abrasions in fruit macroscopic for the purpose of facilitating inspection and culling, the steps comprising treating fruit with a fluid coloring reagent adapted to be preferentially adsorbed into the abraded portions whereby to form distinctive markings, and grading the fruit by separating the marked fruit from the fruit which is unmarked by said treatment.

Signed at Washington, District of Columbia, this 13th day of May, A. D. 1930.

HUGH T. O'NEILL.
ARTHUR J. HARRIMAN.